United States Patent
Price

[15] 3,680,574
[45] Aug. 1, 1972

[54] FLUID FLOW CONTROL DEVICE

[72] Inventor: Charles E. Price, 505 Gulf Rd., North Palm Beach, Fla. 33408

[22] Filed: July 28, 1970

[21] Appl. No.: 58,851

[52] U.S. Cl..................................................137/81.5
[51] Int. Cl...............................................F15c 1/04
[58] Field of Search........................................137/81.5

[56] References Cited

UNITED STATES PATENTS

| | | | |
|---|---|---|---|
| 3,139,895 | 7/1964 | Comparin | 137/81.5 |
| 3,331,379 | 7/1967 | Bowles | 137/81.5 |
| 3,182,675 | 5/1965 | Zilberfarb et al. | 137/81.5 |
| 3,208,462 | 9/1965 | Fox et al. | 137/81.5 |
| 3,460,556 | 8/1969 | Sowers | 137/81.5 |
| 3,545,466 | 12/1970 | Bowles | 137/81.5 |
| 3,570,513 | 3/1971 | Salvinski et al. | 137/81.5 |

*Primary Examiner*—Samuel Scott
*Attorney*—John R. Walker, III

[57] ABSTRACT

A three-dimensional mono-stable proportional device or fluid amplifier capable of simultaneously performing as a digital device and proportional amplifier, i.e., producing a NOR logic function concurrently with the proportional function. The principle of operation is based on the Coanda or Wall effect. The device has two or more outputs, i.e., the outputs have a proportional relationship one with the other, additionally, an output may include a NOR function. The device may be formed from plastic or the like and lends itself to extremely board tolerances in the manufacturing process, i.e., fluid passageways including power ports, control ports, and outlet ports may be molded integrally with the main body (eliminating costly photoetching and lamination) without degradation of performance. The device includes structure for biasing the main stream to one stable position, assuring passage thereof outwardly through a single outlet port or proportionally dividing it between outlet ports, as desired, when the control ports are deactivated, i.e., the Coanda or Wall effect is maintained at all times independent of the stream from the control ports.

2 Claims, 9 Drawing Figures

PATENTED AUG 1 1972　　3,680,574
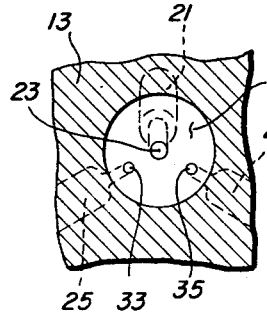
FIG. 2
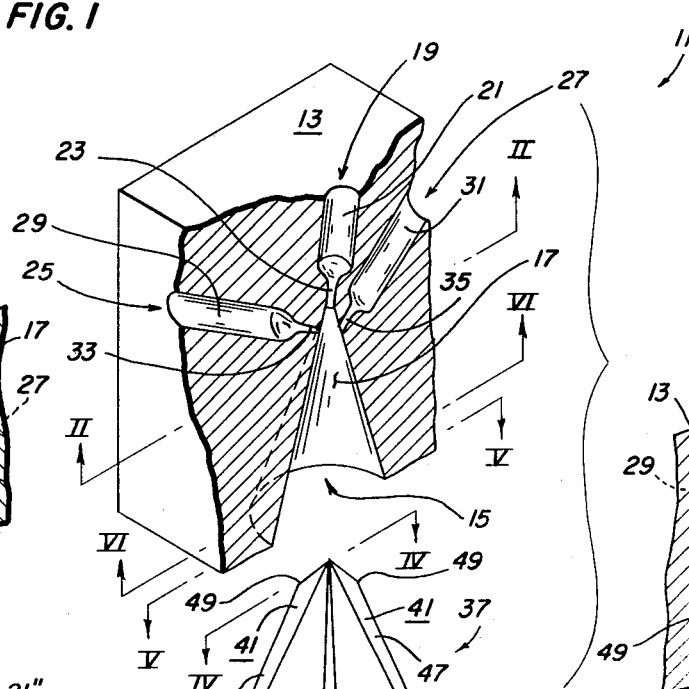
FIG. 1
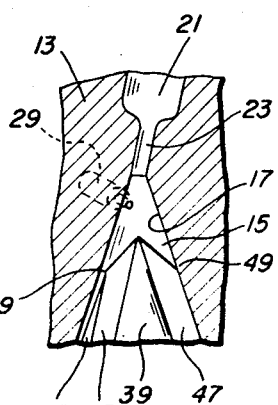
FIG. 3
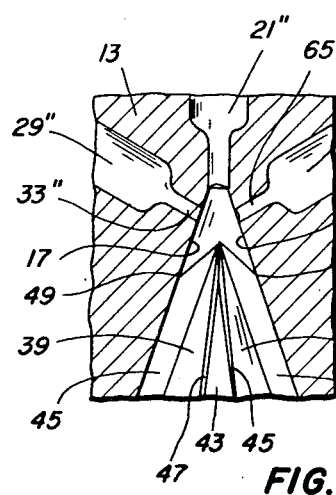
FIG. 8   FIG. 4
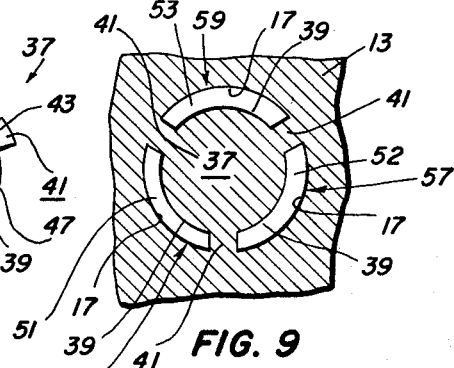
FIG. 5   FIG. 9
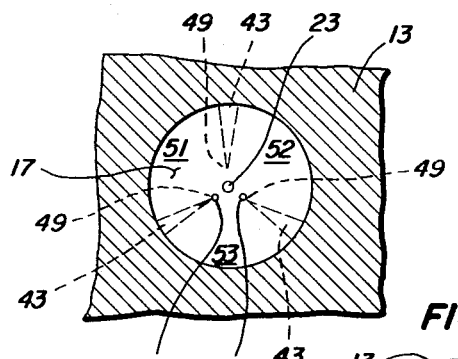
FIG. 6
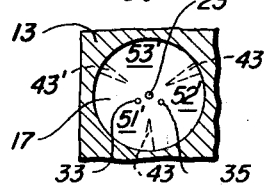
FIG. 7
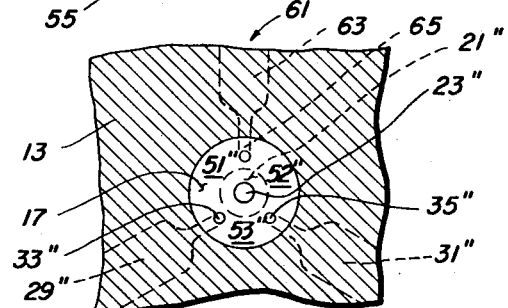
INVENTOR.
CHARLES E. PRICE
BY John R. Walker, III
Attorney

FLUID FLOW CONTROL DEVICE

BACKGROUND OF THE INVENTION

1. Field of the Invention

This invention pertains to the field of fluid amplifiers and more particularly to a three dimensional fluid flow control device.

2. Description of the Prior Art

Technology of the pure-fluid amplifier, based on the principles of momentum conservation, better known as fluidics, is a relatively new field. Initially, the devices were made up of a plurality of platelike members, one having photoetched passageways recessed therein and a second platelike member, being a mirror image of the first, laminated thereto so as to provide passageways for the fluid.

The three dimensional fluid amplifier was later introduced and the extent of the prior art known to the applicant will be discussed herein. The Schonfeld et al. U.S. Pat. No. 3,375,841; the Goldschmied U.S. Pat. No. 3,405,724, and the Peoples U.S. Pat. No. 3,493,003 are fluid control devices; however, the apparent common structure of these patents with the present invention consists of the three dimensionallity.

The Bains U.S. Pat. No. 3,421,324 is directed towards providing a thrust control for a rocket engine. This device is void of a bias means and is actuated by pyrotechnic devices positioned in control chambers as opposed to the normal active control ports. Additionally, U.S. Pat. No. 3,421,324 patent is not capable of solving a logical function.

The Tooze U.S. Pat. No. 3,350,011 is a digital device and has no means of attaining a proportional outlet.

The Sowers U.S. Pat. No. 3,460,556 pertains to a multi-stable device whereas the present invention is monostable. Secondly, the mainstream in the U.S. Pat. No. 3,460,556 patent must be deflected in order to be placed against the wall. The mainstream of the present invention is never unattached from the wall, therefore, obviating the need for an interaction chamber. Thirdly, the U.S. Pat. No. 3,460,556 patent incorporates the use of control jets arranged in pairs, a feature unnecessary for the device of the present invention. Fourthly, the U.S. Pat. No. 3,460,556 patent teaches a device having a digital output. The device of the present invention has an analog and digital output.

The design characteristics of prior fluid flow control devices have dictated the employment of rather expensive manufacturing techniques, i.e., photo-etching and the like. The dimensional tolerances of the structure of prior devices has precluded the use of lesser expensive manufacturing techniques, i.e., casting a device integrally, having the necessary passageways molded therein.

SUMMARY OF THE INVENTION

The present invention is directed towards overcoming the disadvantages and problems relative to previous fluid amplifiers. The principle of operation of the fluid amplifier of the present invention is that it depends on the Coanda or Wall effect. A unique feature of the present invention is that the mainstream of fluid in a proportional amplifier is biased so as to be directed against the wall without any control signal, as opposed to the conventional practice of having the mainstream enter into an interaction space. The control signals, comprising a stream of fluid entering through control ports impinging the mainstream, diverts the mainstream to other portions of the wall, however, the mainstream never leaves the wall. By maintaining wall contact, the advantages of the Coanda or Wall effect are not lost, resulting in better stability as the mainstream is redirected about the wall.

A well known principle of operation associated with the Coanda or Wall effect is that the mainstream once being directed against a wall will continue to cling to the wall even after the force which diverted the mainstream is removed. Devices employing this principle of operation in reality had no normal output, i.e., a port from which the mainstream would normally return to after all control ports have been closed. The unique bias means of the device of the present invention is acting upon the direction of the mainstream at all times and when the control inputs are nil, the mainstream will always return to a predetermined normal output port. This feature enables the device of the present invention to be more flexible than prior devices in its intended use, i.e., there is more than one function available; a logic function having a proportional output in addition to simultaneously performing as a digital device providing a NOR logic function.

An important feature of the present invention is the extremely broad tolerances in the dimension of the structure of the device. This feature enables the device of the present invention to be inexpensively manufactured, e.g., integrally molding plastic or the like so that the fluid passageways including the power ports, control ports and outlet ports may be molded integrally without degradation of performance.

A second advantage of the device of the present invention is that since the one device is capable of providing a proportional (analog) output, as well as a logical (digital) output simultaneously, the quantity of amplifiers in a given piece of equipment necessary to perform a logical operation is greatly reduced, i.e., in a process control system or the like.

A third advantage is that the device of the present invention is less susceptible to particulate contamination, i.e., the rounded constriction allows a larger particle to pass than do the flattened rectangular constrictions of prior devices.

A fourth advantage is that this device has a higher gain ratio, i.e., allows a higher supply pressure to control pressure ratio, thus causing a higher output pressure to control pressure ratio.

A fifth advantage of the device of the present invention is the previously described no-flow condition in the proportional output port when there is a no-flow condition in the control ports. This is accomplished by the above-mentioned bias action which returns the mainstream to the normally positioned or the biased output port.

BRIEF DESCRIPTION OF THE DRAWING

FIG. 1 is a perspective exploded view of the device of the present invention having portions thereof broken away and/or disassociated for clarity.

FIG. 2 is a sectional view taken as on the line II—II of FIG. 1 with the conical lower portion thereof removed as shown in FIG. 1.

FIG. 3 is an enlarged sectional view showing the angular displacement of the mainstream nozzle and the conical chamber receiving the conical lower portion shown in FIG. 1 so as to assume a preferred assembled relationship.

FIG. 4 is a view taken as on the line IV—IV of FIG. 1.

FIG. 5 is a sectional view taken as on the line V—V of FIG. 1 with the conical lower portion being shown integrally in place.

FIG. 6 is a sectional view taken as on the line VI—VI of FIG. 1 with the relationship of the fins of the lower portion being shown in dotted lines.

FIG. 7 is a view taken in like manner as FIG. 6, however, disclosing a second embodiment wherein the lower portion shown in FIG. 1 is rotated so as to assume a distinguishing orientation with the supply port inlets and the control port inlets.

FIG. 8 is an enlarged sectional view similar to FIG. 3 showing a third embodiment wherein a longitudinal axis of the supply port is substantially in alignment with the vertical axis of the chamber.

FIG. 9 is a view similar to FIG. 2 depicting the preferred angular relationship between the supply port and a plurality of control ports for the third embodiment.

DESCRIPTION OF THE PREFERRED EMBODIMENTS

The mono-stable fluid control device or pure-fluid amplifier of the present invention is character-referenced by the numeral 11. The device 11 generally comprises: a main body portion 13 including a chamber 15 having a continuous conical wall 17, a mainstream nozzle or supply port inlet 19 including a supply port 21 and a constricted throat portion 23 communicating with the chamber 15 adjacent the apex of the conical wall 17, a plurality of control nozzles or control port inlets 25, 27 including respective control ports 29, 31 having respective constricted throat portions 33, 35 communicating with the chamber 15 adjacent the apex of the conical wall 17.

The device 11 includes a fluid gathering means 37 which is received within the chamber 15 and may be formed concurrently with the main body portion 13 or formed as a separate entity later to be joined thereto in any well known manner, e.g., a bonding agent (not shown).

An important feature of the device 11 of the present invention is that the dimensional tolerances are much less critical than for prior known devices. This allows the use of casting techniques in forming the device 11 rather than the photo-etch techniques used in known commercial production. Accordingly, the device 11 may be molded integrally from a plastic substance or the like without degradation of performance, a feature which greatly reduces the production costs, affording an opportunity for more widespread use of fluid amplifiers per se.

From FIGS. 1 and 4 of the drawings, it may be seen that the fluid gathering means 37 includes a splitter fin support member 39 having a conical shape, the dimensions of which are considerably less than the dimensions of the conical wall 17. Included with the fluid gathering means 37 are a plurality of splitter fin members 41 preferably arranged symmetrically radially about the conical surface of the support member 39. The splitter fins 41, each having identical structure, have three converging surfaces, 43, 45, 47, having a shape substantially as illustrated in the drawings. The three surfaces 43, 45, 47 converge at a point 49 a predetermined distance outwardly from the splitter fin support member 39 adjacent the apex thereof. It should be understood that when the device 11 is molded integrally, i.e., the main body portion 13 and the fluid gathering means 37 being molded in unity, the surface 43, in a sense, would be non-existant, i.e., being integrally formed with the conical wall 17. Further, when the portion 13 and the fluid gathering means 37 are formed separately, the surface 43 of each of the fins 41 contiguously engages the wall 17 when the fluid gathering means 37 is inserted into the chamber 15.

The fluid gathering means 37 divides the chamber 15 into a plurality of separate passageways 51, 52, 53, as best viewed in FIG. 5. It should be apparent from FIG. 5 that respective portions of the conical wall 17 define in part each of the passageways 51, 52, 53 which terminate at the lower end of the fluid gathering means 37 forming respective outlet ports 55, 57, 59.

The device 11, in the preferred embodiment, includes a bias means which comprises orientating the supply port 21 so that its longitudinal axis is angularly displaced from the vertical axis of the chamber 15 (FIG. 3) so as to normally direct a mainstream of fluid (not shown) issuing from the supply port 21, inwardly against a portion of the conical wall 17. This portion of the wall 17 defines in part the passageway 53 (FIG. 5) which is bounded on the opposite side by the conical portion of the support member 39 and on the ends by the respective splitter fins 41, i.e., a surface 45 on the one side and a surface 47 on the other. The greater the angle between the longitudinal axis of the supply port 21 and the vertical axis of the chamber 15, the greater in magnitude is the bias, i.e., a greater force being required to divert the mainstream of fluid (not shown), a feature yet to be described.

Prior fluid amplifiers generally consisted of a main or power jet issuing from a control nozzle and two control jets positioned at right angles to the power jet, one on each side of the power stream. So long as no control signal (a jet of fluid) issues from either the righthand and/or lefthand control jet, the main jet issues straight from the nozzle and exists through the neutral port. If a control jet issues from the lefthand control jet, the main power jet will be deflected toward the right and due to the Coanda effect or the Wall effect, the power stream remains attached to the wall even if the flow from the control jet is terminated. Conversely, if the right control sends forth a jet, the power jet will be deflected toward the left. The angle of deflection of the power jet is a function of the momenta of the control jets. These prior devices employed a jet interaction space for diverting the main or power jet.

The device 11 of the present invention is unique in a proportional device in that the mainstream of fluid (not shown) issuing from the supply port 21 is biased so as to be directed against the wall 17 without any control or input signal, rather than coming into an interaction space. The control ports 29, 31, having their longitudinal axes angularly displaced from the vertical axis of the chamber 15, are suitably aligned annularly so as to direct a flow of fluid (not shown) transversely inwardly striking the mainstream of fluid diverting it against other portions of the conical wall 17, i.e., these portions defining in part other passageways, e.g., 52, 53. Accordingly, if the output from the outlet port 55 (passageway 51) is fed into a suitable sensing device (not shown) and the output from the outlet ports 57, 59 (respective passageways 52, 53) being dumped or bleeded overboard, i.e., the main stream biased so as to exit either outlet port 57 or 59, the output from the outlet port 55 would be proportional to its respective control input signal or the fluid issuing from the throat portion 35 of the control port 31.

However, the above function by no means describes the full capability of the device 11, i.e., it may be that only one signal is needed which would represent the proportional difference in pressure between two input signals, in which case the control port 29 would receive one signal and the port 31 the other, i.e., the main stream being biased into the passageway 53 or normally exiting out the outlet port 59. In this event, the output from the outlet port 55 would be proportional to the difference in pressure between the two input signals and is fed into the sensing device (not shown), the fluid issuing from the other output ports 57, 59 being dumped. It should be understood that while only two control ports 29, 31 and three outlet ports 55, 57, 59 are conveniently shown in the drawings, the invention is not to be so limited since the device 11 may include any number of control ports and respective outlet ports, depending upon the desired or intended utilization thereof.

The device 11, as above described, is capable of performing as a digital device, i.e., producing a NOR logic function, concurrently with the proportional function. In this regard, the output signals from the output ports 55, 57 (respective passageways 51, 52), is fed into suitable sensing devices (not shown) and the output signal from the output port 59 would then be a bleed leg, i.e., the mainstream would be biased to the passageway 53 communicating with the outlet port 59, and there would be control inputs fed into the control ports 29, 31. A signal or stream issuing from either of the control ports 29, 31 would divert the mainstream into either the outlet port 55 or the outlet port 57. In either event there would be no flow of fluid outwardly from the outlet port 59. In other words, if either of the control ports 29, 31 is on, the outlet port 59 is off. This "on" or "off" condition for the outlet port 59 provides the necessary data for the NOR logic function. Since the mainstream is biased to the passageway 53, it will return to that passageway 53 when the control ports 29, 31 are closed. Additionally, the output ratio of the outlet port 55 to the outlet port 57 would be proportional to the difference in pressures between their respective input signals or control ports 29, 31, thusly concurrently providing the proportional function when desired.

Referring now to FIG. 7 of the drawings wherein a second embodiment of the device 11 depicts the fluid gathering means 37 rotated or displaced, i.e., with respect to the respective throat portions 23, 33, 35 of the nozzles 19, 25, 27. It should be understood that for clarity the entire fluid gathering means 37 is not depicted in FIG. 7, i.e., only the surface 43 of the respective splitter fins 41 is shown.

The second embodiment of the device 11, having structure identical to that described for the first embodiment, performs in a very similar manner. The mainstream nozzle 19, being oriented so that its longitudinal axis is angularly displaced from the vertical axis of the chamber 15, is biased or directed inwardly against the conical wall 17 as above described. However, the fluid issuing from the mainstream is divided, i.e., a portion thereof normally passing through the passageway 51' and a substantially equal portion thereof passing through the passageway 52'. In this embodiment of the device 11, the output taken from the passageway 53' would have its maximum amplitude, i.e., substantially equal to the pressure of the mainstream, when the input signals through the respective control ports communicating with the throat portions 33, 35 are precisely equal.

The variance in amplitude of the output from the passageway 53' is proportional to the difference in pressure between the input signals discharged through the throats 33, 35. This second embodiment of the device 11 performs as a digital device, i.e., produces an OR logic function by feeding the output from the passageway 53' to a suitable sensing device (not shown). The sensing device is "on" if either control port communicating with the respective throats 33, 35 is on, i.e., fluid flowing through it, and is "off" if fluid ceases to flow outwardly from the throats 33, 35. It should be understood that this second embodiment may also include any number of control ports and respective outlet ports without departing from the spirit and scope of this invention.

Referring now to FIGS. 8 and 9 of the drawings wherein a third embodiment of the device 11 is depicted, the important concept of this third embodiment is the means by which the mainstream of fluid (not shown) is biased. It should be noted that the supply port 21'' is substantially in alignment with the vertical axis of the chamber 15 and an additional control nozzle 61 has been added. The control nozzle 61 includes a control port 63 which leads into a constricted throat portion 65 communicating with the chamber 15. It should be understood that the fluid gathering means 37 may be arranged within the chamber 15 of this third embodiment of the device 11 in a manner previously described for the first embodiment or the second embodiment depending upon the desired utilization. However, for convenience the third embodiment, as depicted in FIG. 9, correlates more closely, in this regard, to the first embodiment depicted in FIG. 6.

The control port 63 is oriented so that it may continuously direct a flow of fluid (not shown) transversely inwardly striking the mainstream of fluid (not shown) issuing from the mainstream nozzle or supply port inlet 21'' which is substantially in alignment with the vertical axis of the chamber 15. The impinging fluid from the control port 61, issuing fluid constantly therefrom, diverts the mainstream of fluid to a normal position along a portion of the conical wall 17, in like manner as does the angularly displaced supply port 21, previously described. In other words, the passageway 53'' carries the mainstream of fluid when there are no input signals or fluid issuing from the throats 33'', 35''. Input signals from either of the throats 33'', 35'' cause the device 11 of the third embodiment thereof to perform identical to the performance described for the first embodiment.

Accordingly, a detailed description of the performance of the third embodiment is considered to be unnecessary. It should be understood that the third embodiment of the device 11 may also include numerous control ports and respective outlet ports without departing from the spirit and scope of this invention.

It should be pointed out, however, that certain advantages are gained by conforming the device 11 to the third embodiment: One advantage is a variable gain in the amplifier. This is primarily because the magnitude of the bias determines the gain of the amplifier. The first and second embodiment provides for the device 11 to be fabricated with various magnitudes of bias, i.e., varying the angle of the axis of the supply port 23; however, this bias is fixed or remains constant once incorporated. The third embodiment of the device 11 of the present invention provides for the bias to be varied while the amplifier is active, i.e., by varying the pressure issuing from the control port 63. The higher the pressure issuing from the port 63 the lower the gain since it would require a higher signal issuing from either of the input ports 29'' or 31'' to divert the main stream from its biased port. Conversely, if the main stream is only slightly biased, e.g., through the passageway 53 then a slight control input, e.g., through control port 29', would divert the main stream into the passageway 52'. Thus a high gain is achieved.

It should be obvious to those skilled in the art that each of the three embodiments of the devices 11 of the present invention may be arranged in a cascade system, i.e., the output from a first amplifier fed into a control input of a second amplifier and the output from the second amplifier fed into the control input of a third amplifier, etc., in order to develop a signal of sufficient strength to perform the desired function.

Although the invention has been described and illustrated with respect to preferred embodiments thereof, it is to be understood that it is not to be so limited since changes and modifications may be made therein which are within the full intended scope of this invention.

I claim:

1. A mono-stable fluid control device comprising a main body portion including a chamber having a continuous conical wall, a main stream nozzle means communicating with said chamber adjacent the apex of said conical wall, bias means, fluid gathering means dividing said chamber into a plurality of separate passageways respectively defined in part by predetermined portions of said conical wall, said bias means including structure for causing the main stream of fluid issuing from said main stream nozzle to be normally directed against a first portion of said conical wall defining in part at least two of said passageways, at least one control nozzle means communicating with said chamber adjacent the apex of said conical wall, a plurality of outlet ports respectively communicating with said passageways, and each of said control nozzle means having its longitudinal axis angularly displaced from the vertical axis of said chamber and so aligned to direct a flow of fluid transversely inwardly striking said main stream of fluid proportionally diverting it against said first portion of said conical wall; said fluid gathering means including a conical shaped body portion, said body portion including radially aligned outwardly protruding splitter fin structure having contiguous engagement with said conical wall of said chamber for separating predetermined respective portions of said conical wall of said chamber into segments defining in part said passageways; said bias means including orienting said main stream nozzle means so that its longitudinal axis is angularly displaced from the vertical axis of said chamber and said orienting additionally includes angularly aligning said nozzle means so that a continuation of its longitudinal axis inwardly would intersect said splitter fin structure of said fluid gathering means so as to normally direct a main stream of fluid inwardly against a portion of said conical wall defining in part two of said passageways.

2. A mono-stable fluid control device comprising a main body portion including a chamber having a continuous conical wall, a main stream nozzle means communicating with said chamber adjacent the apex of said conical wall, bias means, fluid gathering means dividing said chamber into a plurality of separate passageways respectively defined in part by predetermined portions of said conical wall, said bias means including structure for causing the main stream of fluid issuing from said main stream nozzle to be normally directed against a first portion of said conical wall defining in part at least two of said passageways, at least one control nozzle means communicating with said chamber adjacent the apex of said conical wall, a plurality of outlet ports respectively communicating with said passageways, and each of said control nozzle means having its longitudinal axis angularly displaced from the vertical axis of said chamber and so aligned to direct a flow of fluid transversely inwardly striking said main stream of fluid porportionally diverting it against said first portion of said conical wall; said fluid gathering means including a conical shaped body portion, said body portion including radially aligned outwardly protruding splitter fin structure having contiguous engagement with said conical wall of said chamber for separating predetermined respective portions of said conical wall of said chamber into segments defining in part said passageways; said bias means including orienting said main stream nozzle means so that its longitudinal axis is angularly displaced from the vertical axis of said chamber and said orienting additionally includes angularly aligning said nozzle means so that a continuation of its longitudinal axis inwardly would intersect said splitter fin structure of said fluid gathering means so as to normally direct a main stream of fluid inwardly against a portion of said conical wall defining in part two of said passageways; at least one of said control nozzle means being oriented so that the stream of fluid issuing therefrom strikes said main stream diverting it along a portion of said wall defining in part one of said passageways.

* * * * *